US012623505B2

(12) United States Patent
Akai et al.

(10) Patent No.: US 12,623,505 B2
(45) Date of Patent: May 12, 2026

(54) SUSPENSION CONTROL DEVICE AND SUSPENSION CONTROL METHOD

(71) Applicant: Hitachi Astemo, Ltd., Hitachinaka (JP)

(72) Inventors: Akihito Akai, Tokyo (JP); Ryusuke Hirao, Hitachinaka (JP)

(73) Assignee: Hitachi Astemo, LTD., Ibaraki (JP)

( * ) Notice: Subject to any disclaimer, the term of this patent is extended or adjusted under 35 U.S.C. 154(b) by 181 days.

(21) Appl. No.: 18/558,283

(22) PCT Filed: Apr. 21, 2022

(86) PCT No.: PCT/JP2022/018462
§ 371 (c)(1),
(2) Date: Oct. 31, 2023

(87) PCT Pub. No.: WO2022/239619
PCT Pub. Date: Nov. 17, 2022

(65) Prior Publication Data
US 2024/0217297 A1 Jul. 4, 2024

(30) Foreign Application Priority Data

May 11, 2021 (JP) ................................. 2021-080532

(51) Int. Cl.
*B60G 17/0165* (2006.01)
*B60G 17/019* (2006.01)
(52) U.S. Cl.
CPC ... *B60G 17/0165* (2013.01); *B60G 17/01908* (2013.01); *B60G 17/01933* (2013.01); *B60G 2400/821* (2013.01); *B60G 2800/916* (2013.01)
(58) Field of Classification Search
CPC .......... B60G 2400/821; B60G 17/0165; B60G 17/01908; B60G 17/01933
See application file for complete search history.

(56) References Cited

U.S. PATENT DOCUMENTS 4,496,937 A 1/1985 Kitagawa et al.
4,770,438 A * 9/1988 Sugasawa ........ B60G 17/01941
188/266.7
(Continued)

FOREIGN PATENT DOCUMENTS

JP S57-086938 A 5/1982
JP 2016-536596 A 11/2016
(Continued)

OTHER PUBLICATIONS

International Search Report and English Translation, PCT/JP2022/018462, Jun. 21, 2022 (4 pgs.).

*Primary Examiner* — Gonzalo Laguarda
(74) *Attorney, Agent, or Firm* — Volpe Koenig

(57) ABSTRACT

A suspension control device that is connected to a sensor that acquires information regarding a vehicle or surrounding information of the vehicle, and calculates a suspension control value for controlling a suspension of the vehicle based on the information acquired by the sensor includes: a reached vibration generation unit that generates a reached vibration reaching the vehicle based on the information acquired by the sensor; a sampling processing unit that samples a vibration waveform of the reached vibration by changing a time width for sampling the vibration waveform of the reached vibration according to a frequency of the reached vibration generated by the reached vibration generation unit; and a control value calculation unit that calculates the suspension control value based on a sampling value of the vibration waveform sampled by the sampling processing unit.

11 Claims, 15 Drawing Sheets

(56) References Cited

U.S. PATENT DOCUMENTS

| 11,524,542 | B2 * | 12/2022 | Kim | B60G 17/01908 |
| 2016/0201277 | A1 | 7/2016 | Svantesson et al. | |
| 2019/0078876 | A1 | 3/2019 | Ouchida et al. | |
| 2019/0092338 | A1 | 3/2019 | Tsukasaki | |
| 2021/0023905 | A1 | 1/2021 | Fujimoto | |
| 2023/0286346 | A1 * | 9/2023 | Yamazaki | B60G 17/018 |
| 2023/0294474 | A1 * | 9/2023 | Matsuura | B60G 17/018 701/37 |

FOREIGN PATENT DOCUMENTS

| JP | 2017-226270 | A | 12/2017 |
| JP | 2019-055757 | A | 4/2019 |
| JP | 2021-017168 | A | 2/2021 |
| WO | 2017/169365 | A1 | 10/2017 |

* cited by examiner

FIG. 3A
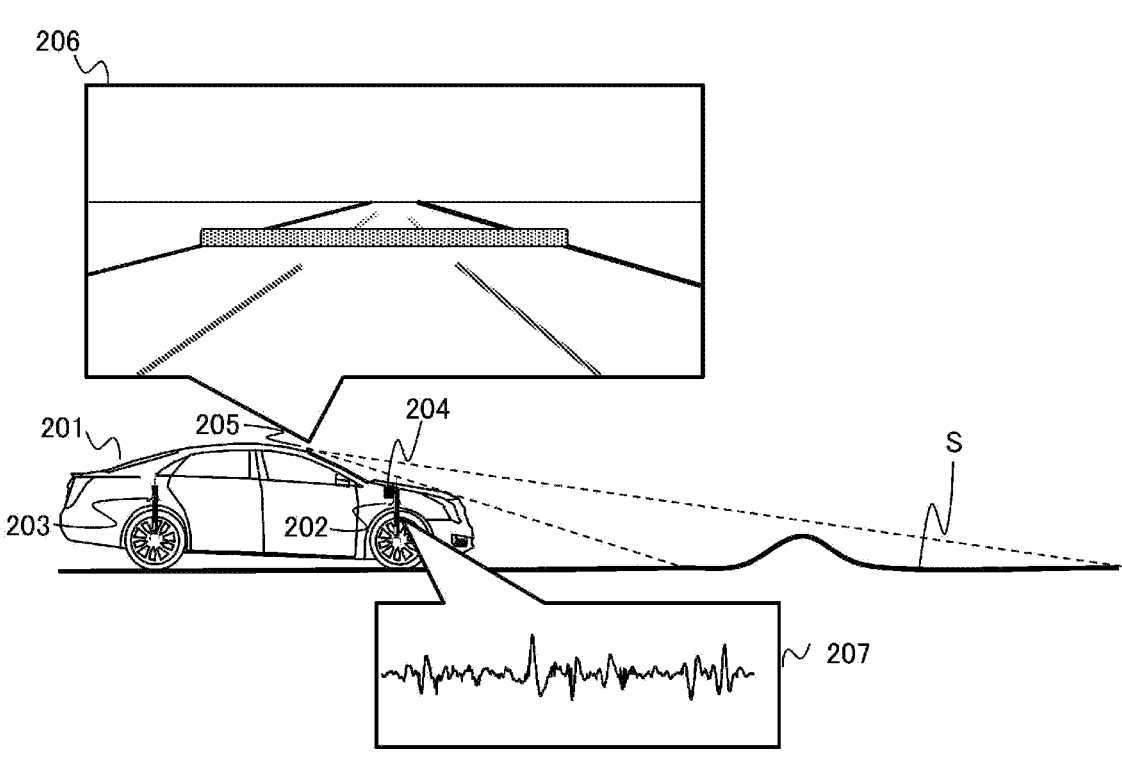
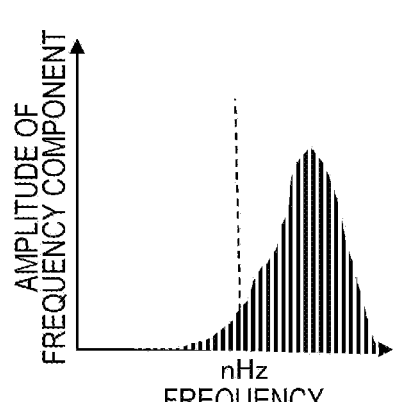
FIG. 3B          FIG. 3C

| ITEM | INPUT SPECIFICATION | |
|---|---|---|
| | FOR LOW FREQUENCIES | FOR HIGH FREQUENCIES |
| WINDOW WIDTH | 1.0s | 0.5s |
| SAMPLING INTERVAL | 20ms | 10ms |
| NUMBER OF SAMPLES | 50 | 50 |

| ITEM | INPUT SPECIFICATION | |
| --- | --- | --- |
| | FOR LOW FREQUENCIES | FOR HIGH FREQUENCIES |
| WINDOW WIDTH | 1.0s | 0.5s |
| SAMPLING INTERVAL | 20ms | 10ms |
| NUMBER OF SAMPLES | 50 | 50 |
| WEIGHT PARAMETER | 804 | 805 |

| ITEM | INPUT SPECIFICATION | | | |
|---|---|---|---|---|
| | PART 1 | PART 2 | PART 3 | PART 4 |
| WINDOW WIDTH | 2.0s | 1.0s | 0.5s | 0.25s |
| SAMPLING INTERVAL | 40ms | 20ms | 10ms | 5ms |
| NUMBER OF SAMPLES | 50 | 50 | 50 | 50 |
| WEIGHT PARAMETER | A | B | C | D |

| No. | ROAD | ROAD PROFILE | |
|---|---|---|---|
| | | DISTANCE (m) | HEIGHT (m) |
| 1 | ROAD A (EXAMPLE) TOTAL 10m | 0.00 | 10.54 |
| | | 0.01 | 10.55 |
| | | 0.02 | 10.50 |
| | | ⋮ | ⋮ |
| | | 9.99 | 10.94 |
| | | 10.00 | 10.93 |
| 2 | ROAD B | 0.00 | 10.92 |
| | | 0.01 | 10.91 |
| | | ⋮ | ⋮ |
| ⋮ | ⋮ | ⋮ | ⋮ |

| No. | ROAD | ROAD TYPE |
|---|---|---|
| 1 | ROAD A | LEVEL ROAD |
| 2 | ROAD B | GRAVEL ROAD |
| 3 | ROAD C | ROUGH ROAD |
| 4 | ROAD D | LEVEL ROAD |
| ⋮ | ⋮ | ⋮ |

SUSPENSION CONTROL DEVICE AND SUSPENSION CONTROL METHOD

TECHNICAL FIELD

The present invention relates to a suspension control device and a suspension control method.

BACKGROUND ART

There is known a suspension control device that controls a posture of a vehicle by changing rigidity, characteristics, and the like of a suspension according to a road surface condition and a driving condition.

PTL 1 discloses a device that continuously acquires high density road surface displacement information of a road surface in front of a vehicle and reduces a probability of occurrence of detection omission of a height of the road surface to obtain highly accurate road surface displacement information, and supplies the obtained road surface displacement information to a suspension system of the vehicle for preview control of an active suspension.

CITATION LIST

Patent Literature

PTL 1: WO 2017/169365 A

SUMMARY OF INVENTION

Technical Problem

The device disclosed in PTL 1 cannot accurately grasp a vibration waveform based on a frequency of a reached vibration reaching the vehicle, and thus, there is a possibility that the suspension cannot be optimally controlled.

Solution to Problem

A suspension control device according to the present invention is a suspension control device that is connected to a sensor that acquires information regarding a vehicle or surrounding information of the vehicle, and calculates a suspension control value for controlling a suspension of the vehicle based on the information acquired by the sensor, the suspension control device including: a reached vibration generation unit that generates a reached vibration reaching the vehicle based on the information acquired by the sensor; a sampling processing unit that samples a vibration waveform of the reached vibration by changing a time width for sampling the vibration waveform of the reached vibration according to a frequency of the reached vibration generated by the reached vibration generation unit; and a control value calculation unit that calculates the suspension control value based on a sampling value of the vibration waveform sampled by the sampling processing unit.

A suspension control method according to the present invention is a suspension control method in a suspension control device that controls a suspension of a vehicle by using a sensor that acquires information regarding the vehicle or surrounding information of the vehicle, the suspension control method including: generating a reached vibration reaching the vehicle based on the information acquired by the sensor; sampling a vibration waveform of the reached vibration by changing a time width for sampling the vibration waveform of the reached vibration according to a frequency of the generated reached vibration; calculating a suspension control value based on a sampling value of the sampled vibration waveform; and controlling the suspension based on the calculated suspension control value.

Advantageous Effects of Invention

According to the present invention, a vibration waveform can be grasped regardless of a frequency of a reached vibration reaching the vehicle, so that the controllability of the suspension can be improved.

BRIEF DESCRIPTION OF DRAWINGS

FIGS. 3(A), 3(B), and 3(C) are diagrams illustrating information acquired from a vehicle sensor or the like and reached vibration frequency analysis.

DESCRIPTION OF EMBODIMENTS

Figure 1:
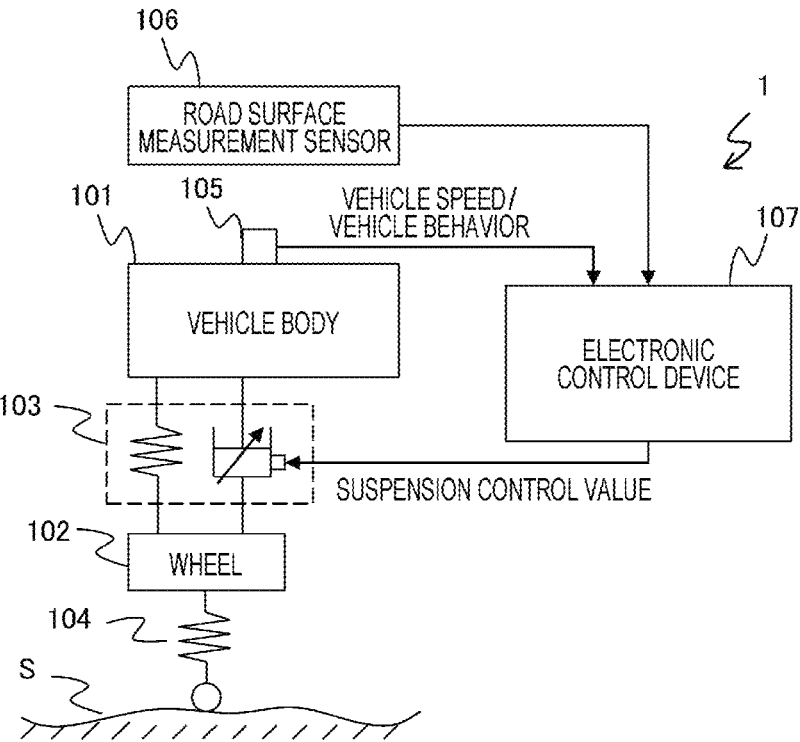
FIG. 1 is a diagram illustrating a suspension control model.

Hereinafter, embodiments of the present invention will be described with reference to the drawings. The following description and drawings are examples for describing the present invention, and omission and simplification are appropriately made for clarity of description. The present invention can be carried out in various other forms. Unless otherwise specified, each component may be plural or singular.

The position, size, shape, range, and the like of each component illustrated in the drawings do not represent the actual position, size, shape, range, and the like in some cases in order to facilitate understanding of the invention. Therefore, the present invention is not necessarily limited to the position, size, shape, range, and the like disclosed in the drawings.

In a case where there are a plurality of components having the same or similar functions, the same reference numerals may be attached with different subscripts for description. However, in a case where it is not necessary to distinguish the plurality of components, the description may be made while omitting the subscript.

In addition, in the following description, processing executed by executing a program may be described. However, the program is executed by a processor (for example, a central processing unit (CPU) or a graphics processing unit (GPU)) to execute predetermined processing by using a storage resource (for example, a memory) and/or an interface device (for example, a communication port) as appropriate. Therefore, the subject of the processing may be the processor. Similarly, the subject of the processing executed by executing the program may be a controller, a device, a system, a computer, or a node including a processor. It is sufficient if the subject of the processing executed by executing the program is an arithmetic operation unit, and may include a dedicated circuit (for example, a field programmable gate array (FPGA) or application-specific integrated circuit (ASIC)) that executes specific processing.

The program may be installed in a device such as a computer from a program source. The program source may be, for example, a program distribution server or a computer-readable storage medium. In a case where the program source is a program distribution server, the program distribution server may include a processor and a storage resource that stores a distribution target program, and the processor of the program distribution server may distribute the distribution target program to another computer. In the following description, two or more programs may be implemented as one program, or one program may be implemented as two or more programs.

First Embodiment

FIG. 1 is a diagram illustrating a suspension control model 1 by a suspension control device according to a first embodiment of the present invention. The suspension control model 1 is a simple model focusing on one wheel of a vehicle around a suspension.

A vibration reaching from a road surface S is transmitted to a tire 104, and is transmitted from a wheel 102 to a damping force control type suspension 103 and then to a vehicle body 101. The vehicle body 101 is provided with a vehicle sensor 105 that acquires vehicle information such as a vehicle speed and a road surface measurement sensor 106 that acquires surrounding information of the vehicle. The road surface measurement sensor 106 is, for example, a stereo camera.

Information acquired by the vehicle sensor 105 and the road surface measurement sensor 106 is input to an electronic control device 107. The electronic control device 107 corresponds to the suspension control device of the present embodiment, and acquires a road surface displacement in front of the vehicle by using, for example, parallax information of an image of the road surface in front of the vehicle captured by the stereo camera. The reached vibration reaching the vehicle is predicted based on the road surface displacement and the vehicle speed. The electronic control device 107 changes a time width for sampling a vibration waveform of the reached vibration according to a frequency of the predicted reached vibration, calculates a suspension control value from a sampling value of the sampled vibration waveform, and controls the suspension 103 based on the calculated suspension control value, which will be described below in detail.

Although FIG. 1 illustrates a simplified model focusing on one wheel of the vehicle, the electronic control device 107 similarly controls the suspension 103 based on the calculated suspension control value for the other wheel including the suspension 103.

Figure 2:
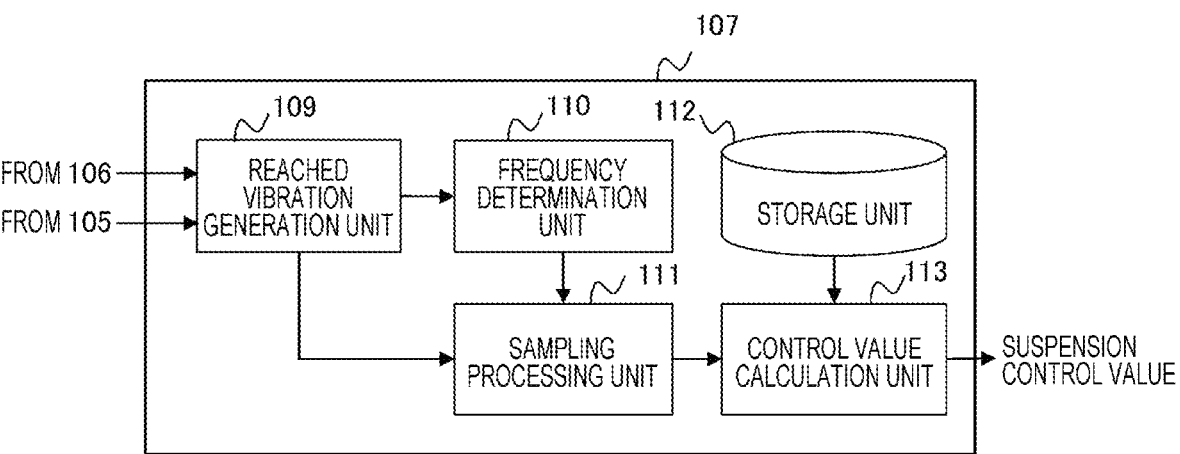
FIG. 2 is a block configuration diagram of an electronic control device.

FIG. 2 is a block configuration diagram of the electronic control device 107.

The electronic control device 107 includes a reached vibration generation unit 109, a frequency determination unit 110, a sampling processing unit 111, a storage unit 112, and a control value calculation unit 113.

The reached vibration generation unit 109 calculates the road surface displacement in front of the vehicle from data received from the road surface measurement sensor 106. Then, the reached vibration predicted to reach the vehicle is generated as time-series data based on the calculated road surface displacement and the detected vehicle speed from the vehicle sensor 105.

The frequency determination unit 110 determines the frequency of the reached vibration generated by the reached vibration generation unit 109. For example, reached vibration frequency analysis is performed to determine whether the peak of the frequency is higher or lower than reference n Hz.

The sampling processing unit 111 samples the vibration waveform of the reached vibration generated by the reached vibration generation unit 109. At this time, the time width for sampling the vibration waveform of the reached vibration is changed according to the frequency of the reached vibration determined by the frequency determination unit 110. For example, in a case where the frequency of the reached vibration is low, the time width is set to be large and a sampling interval is set to be wide, and in a case where the frequency of the reached vibration is high, the time width is set to be small and the sampling interval is set to be narrow. The sampling value of the sampled vibration waveform is input to the control value calculation unit 113.

The control value calculation unit 113 applies a parameter stored in advance in the storage unit 112 as necessary, and calculates the suspension control value based on the sampling value of the vibration waveform transferred from the sampling processing unit 111. Although a case where the parameter is stored in the storage unit 112 is described as an example, the parameter may be obtained from the outside of the electronic control device 107 via a network or the like and applied. Furthermore, the parameter is, for example, a weight parameter of a neural network to be described later.

FIGS. 3(A), 3(B), and 3(C) are diagrams illustrating information acquired from the vehicle sensor 105 and the like and the reached vibration frequency analysis. FIG. 3(A) is a diagram illustrating information acquired from the vehicle sensor 105 and the road surface measurement sensor 106, and FIGS. 3(B) and 3(C) are diagrams illustrating the reached vibration frequency analysis.

In the example illustrated in FIG. 3(A), an acceleration sensor 204 as the vehicle sensor 105 and a camera 205 as the road surface measurement sensor 106 are mounted on a vehicle 201. The suspension 103 includes a front wheel suspension 202 and a rear wheel suspension 203.

A camera image 206 obtained from the camera 205 and sensor data 207 which is time-series data output from the acceleration sensor 204 installed on a spring of the front wheel suspension 202, for example, in a case where the vehicle 201 travels on the road surface S having a bump are illustrated.

In a case where the camera 205 is a stereo camera, the electronic control device 107 can derive distance information from parallax information of camera images and estimate a timing or magnitude of the reached vibration expected to reach the vehicle 201 based on the vehicle speed, thereby generating the reached vibration as time-series data. Furthermore, in a case where the camera 205 is a monocular camera, it is possible to estimate the timing or magnitude of the reached vibration expected to reach the vehicle from images of frames in different time directions, thereby generating the reached vibration as time-series data. Although FIG. 3(A) illustrates a case where a straight road is in front of the vehicle, the reached vibration may be generated as time-series data in various traveling routes such as a curved road by calculating a traveling direction based on steering angle information of the vehicle and the like.

The frequency determination unit 110 performs frequency analysis to determine the frequency of the reached vibration, and FIGS. 3(B) and 3(C) are diagrams illustrating the frequency analysis. The horizontal axis represents the frequency, and the vertical axis represents the magnitude of a frequency component. In FIG. 3(B), the peak of the frequency is lower than the reference n Hz. In this case, the frequency determination unit 110 determines that the frequency of the reached vibration is low. In FIG. 3(C), the peak of the frequency is higher than the reference n Hz. In this case, the frequency determination unit 110 determines that the frequency of the reached vibration is high.

Figure 4A:
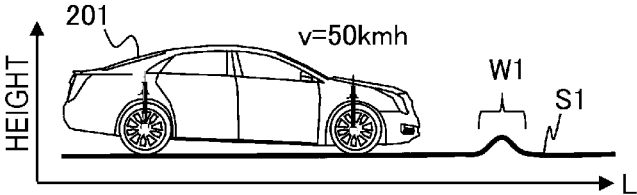
FIGS. 4(A), 4(B), and 4(C) are diagrams illustrating a road surface and a vibration amplitude.
Figure 4B:
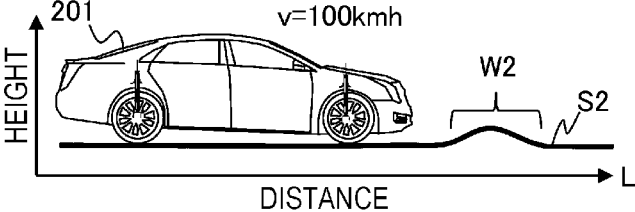
Figure 4C:
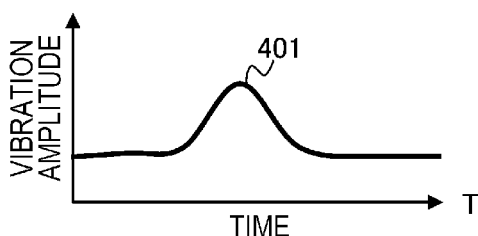

FIGS. 4(A), 4(B), and 4(C) are diagrams illustrating a road surface and a vibration amplitude.

FIG. 4(A) illustrates an example in which the vehicle 201 travels at 50 km/h on a road surface S1 having a bump with a depth W1 in front of the vehicle 201. FIG. 4(B) illustrates an example in which the vehicle 201 travels at 100 km/h on a road surface S2 having a bump with a depth W2 in front of the vehicle 201. The bump with the depth W2 has a depth (width) twice as large as the bump with the depth W1, and has the same height as the bump with the depth W1.

FIG. 4(C) is a graph illustrating the vibration amplitude for the vehicle 201. In each of the cases of FIGS. 4(A) and 4(B), a vibration amplitude 401 for the vehicle 201 is equivalent to that shown on the time axis as illustrated in FIG. 4(C). In other words, from the viewpoint of vibration, even in a case where the road surface displacement in front of the vehicle can be grasped, the vibration reaching the vehicle 201 differs depending on the speed of the vehicle 201.

Figure 5A:
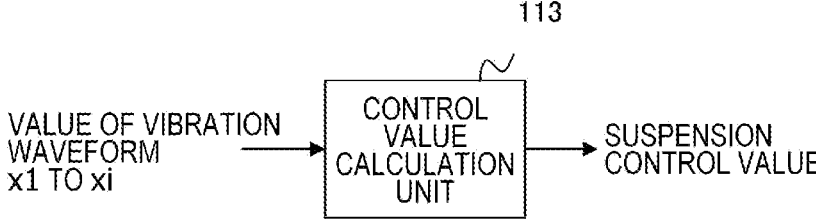
FIGS. 5(A), 5(B), and 5(C) are diagrams illustrating a relationship between a value of a vibration waveform and a suspension control value.
Figure 5B:
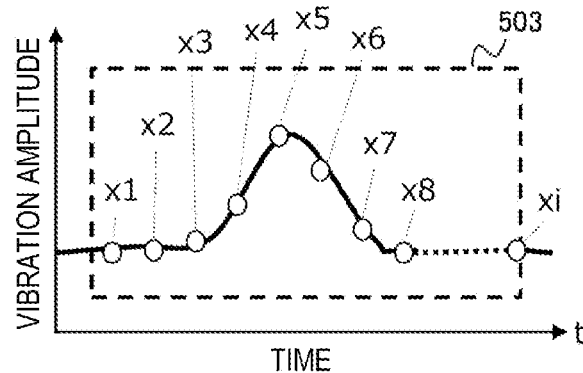
Figure 5C:
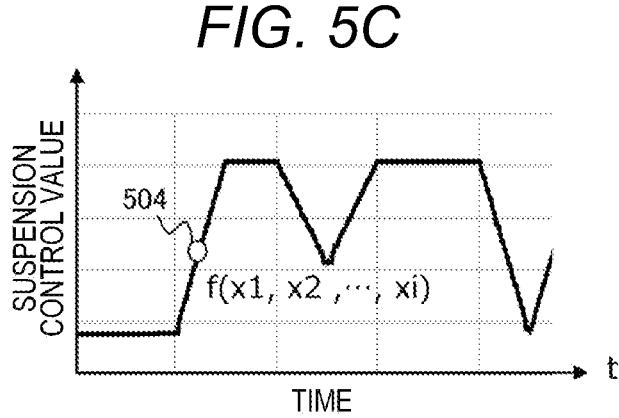

FIGS. 5(A), 5(B), and 5(C) are diagrams illustrating a relationship between the sampling value of the vibration waveform and the suspension control value. FIG. 5(A) illustrates the control value calculation unit 113, FIG. 5(B) illustrates the sampling value of the vibration waveform of the reached vibration, and FIG. 5(C) illustrates the suspension control value.

As illustrated in FIG. 5(A), the control value calculation unit 113 calculates the suspension control value based on input sampling values x1 to xi of the vibration waveform.

As illustrated in FIG. 5(B), the vibration waveform of the reached vibration is sampled by the sampling processing unit 111 to be converted into time-series discrete value data, and is input to the control value calculation unit 113. The sampling processing unit 111 defines a window width 503 (which may hereinafter be referred to as a time width) that defines a constant time width on the time axis, and samples i sampling values (x1 to xi) from the vibration waveform in the window width 503. Here, the number i of sampling values in the window width 503 is not changed, and a time width in which the feature of time-series data can be well captured is set. As described below, the sampling processing unit 111 changes the time width for sampling the vibration waveform of the reached vibration according to the frequency of the reached vibration.

Then, the control value calculation unit 113 calculates the suspension control value based on the sampling value of the vibration waveform sampled by the sampling processing unit 111. Then, a suspension control value 504 illustrated in FIG. 5(C) is output.

Figures 6A, 6B, 6C:
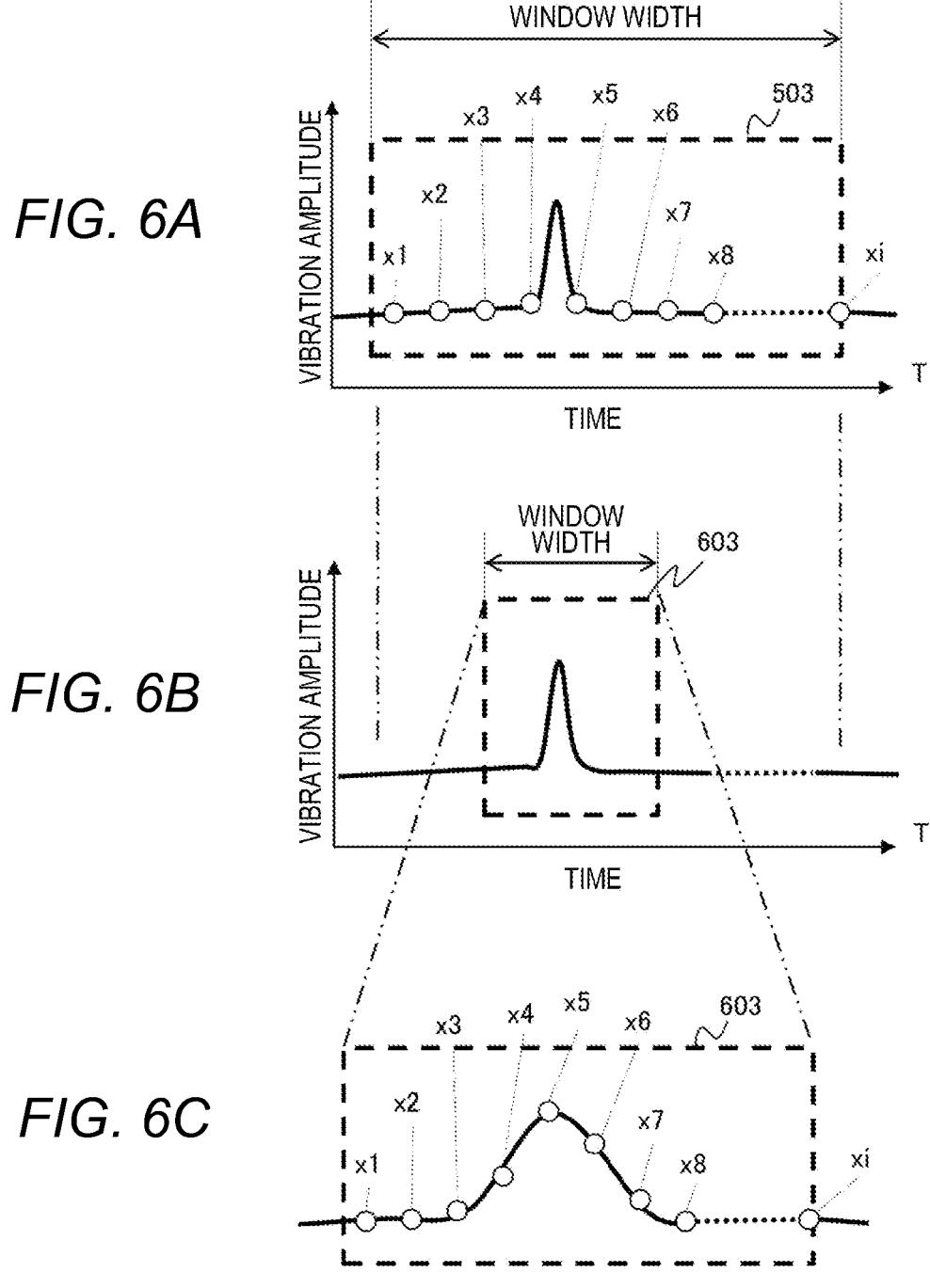
FIGS. 6(A), 6(B), and 6(C) are diagrams illustrating a relationship between the vibration waveform and a time width.

FIGS. 6(A), 6(B), and 6(C) are diagrams illustrating a relationship between the vibration waveform and the time width. FIG. 6(A) illustrates a case of a predetermined time width. FIG. 6(B) is a case of a narrow time width, and FIG. 6(C) is a partially enlarged view of FIG. 6(B).

In a case where the frequency component of the vibration waveform is in a low frequency band as illustrated in FIG. 5(B), i sampling values (x1 to xi) in the window width 503 can be sampled to capture the vibration waveform representing the bump of the road surface. However, in a case where the frequency component of the vibration waveform is in a high frequency band as illustrated in FIG. 6(A), the vibration waveform representing the bump of the road surface cannot be captured between sampling points x4 and x5 in the window width 503 in some cases.

Therefore, before performing sampling by the sampling processing unit 111, the frequency determination unit 110 performs the vibration waveform frequency analysis for the reached vibration generated by the reached vibration generation unit 109. In a case where it is determined that the frequency is high, the sampling processing unit 111 decreases the time width as illustrated in FIG. 6(B), namely, sets a small window width 603, and acquires i sampling values (x1 to xi) as illustrated in FIG. 6(C). The number of samples of the vibration waveform is a constant number i regardless of the time width (window width). Since the sampling value of the sampled vibration waveform is a constant value, processing of calculating the suspension control value by the control value calculation unit 113 can be simplified.

Figures 7A, 7B:
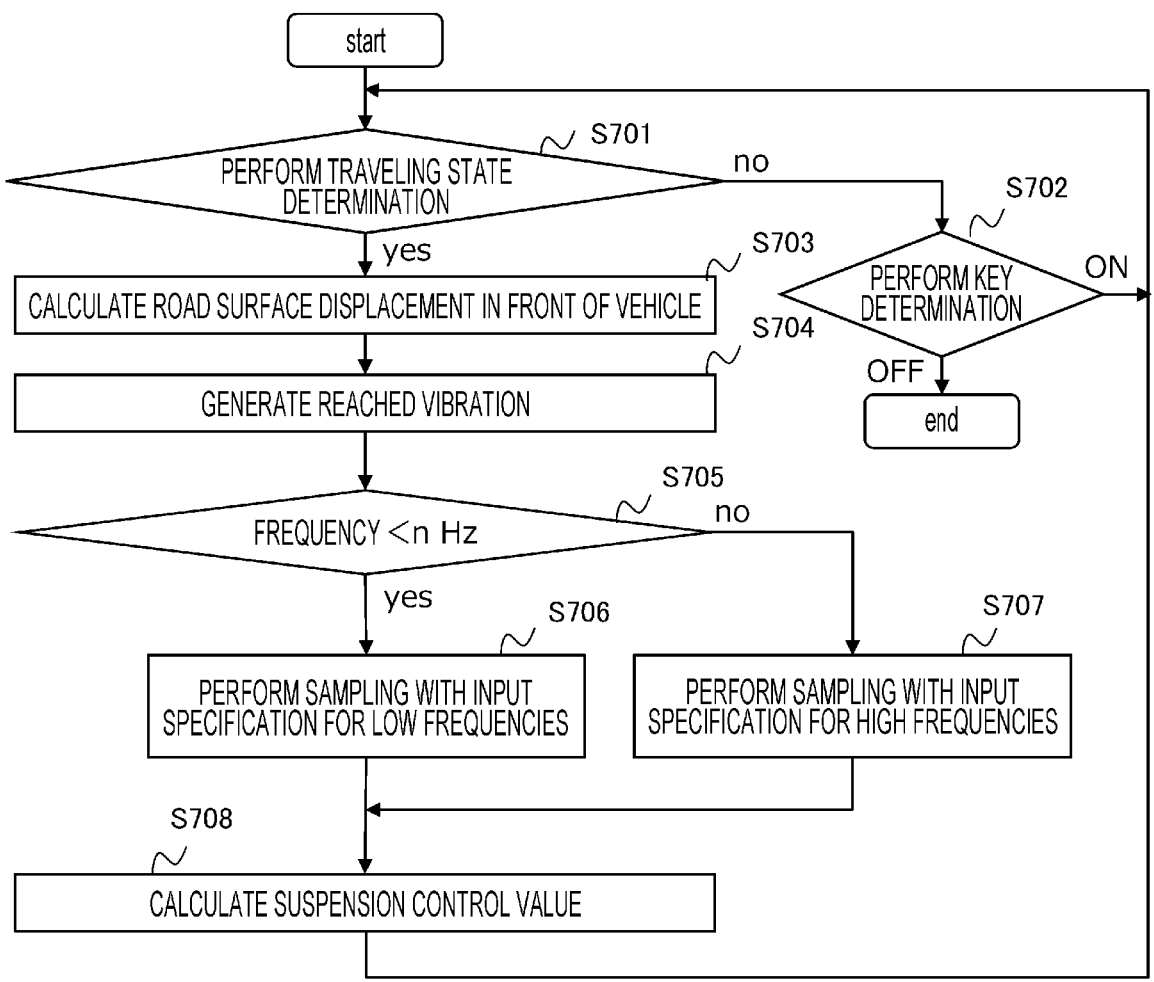
FIGS. 7(A) and 7(B) are a flowchart illustrating processing in the electronic control device according to a first embodiment and a diagram illustrating an input specification.

FIGS. 7(A) and 7(B) are a flowchart illustrating processing in the electronic control device 107 according to the first embodiment and a diagram illustrating an input specification. FIG. 7(A) is a diagram illustrating a flowchart illustrating the processing in the electronic control device 107, and FIG. 7(B) is a diagram illustrating the input specification in the processing in the electronic control device 107. The flowchart illustrates the processing executed by the electronic control device 107 executing a program. The same applies to flowcharts for other embodiments.

In step S701, it is determined whether the vehicle is in a traveling state or a stopped state. In a case where the vehicle is in the stopped state, the processing proceeds to step S702, and it is determined whether an ignition key is ON or OFF. In a case where the ignition key is OFF in step S702, the processing ends. In a case where the ignition key is ON, the processing returns to step S701. In a case where it is determined in step S701 that the vehicle is in the traveling state, the processing proceeds to step S703.

In step S703, the reached vibration generation unit 109 of the electronic control device 107 calculates the road surface displacement in front of the vehicle from data received from the road surface measurement sensor 106. Then, in next step S704, the reached vibration generation unit 109 generates the reached vibration reaching the vehicle based on the calculated road surface displacement and the detected vehicle speed from the vehicle sensor 105. The reached vibration is time-series data of the vibration expected to reach the vehicle. A time point at which the vehicle reaches is calculated based on the vehicle speed, and the suspension is controlled based on the suspension control value calculated as described later at the reaching time point.

Next, in step S705, the frequency determination unit 110 determines the frequency of the reached vibration generated by the reached vibration generation unit 109. Specifically, the reached vibration frequency analysis is performed to determine whether the peak of the frequency is higher or lower than the reference n Hz. In a case where the peak of the frequency is lower than the reference n Hz, the processing proceeds to step S706, and in a case where the peak of the frequency is equal to or higher than the reference n Hz, the processing proceeds to step S707.

In step S706, the sampling processing unit 111 performs sampling with the input specification for low frequencies illustrated in FIG. 7(B). FIG. 7(B) illustrates an example of the input specification for low frequencies, in which the window width is 10 seconds, the sampling interval is 20 ms, and the number of samples is 50. That is, the vibration waveform is sampled with the window width set large and the sampling interval set wide. As a result, as illustrated in FIG. 5(A), i sampling values (x1 to xi) are acquired from the vibration waveform in the window width 503. In this example, i=50.

In step S707, the sampling processing unit 111 performs sampling with the input specification for high frequencies illustrated in FIG. 7(B). FIG. 7(B) illustrates an example of the input specification for high frequencies, in which the window width is 0.5 seconds, the sampling interval is 10 ms, and the number of samples is 50. That is, the vibration waveform is sampled with the time width set to be small and the sampling interval set to be narrow. The number of samples is the same as that in a case of the low frequency. As a result, as illustrated in FIG. 6(C), i sampling values (x1 to xi) are acquired from the vibration waveform in the window width 603. In this example, i=50.

After the processing of step S706 or step S707, the processing proceeds to step S708. In step S708, the control value calculation unit 113 calculates the suspension control value by using the sampling values (x1 to xi) of the sampled vibration waveform. The electronic control device 107 controls the suspension based on the calculated suspension control value according to the time point at which the corresponding reached vibration reaches the vehicle.

After the processing of step S708, the processing returns to the processing of step S701, and the vibration waveform can be accurately grasped and the suspension can be optimally controlled regardless of the frequency of the reached vibration reaching the vehicle by repeating steps S703 to S708 described above. As a result, it is possible to accurately grasp the feature of the road surface on which the vehicle is scheduled to travel and to control the suspension, so that it is possible to achieve suitable ride comfort.

The reached vibration may be acquired not only from the camera 205 but also from the acceleration sensor 204 or the like. In this case, a vehicle behavior obtained by the vehicle sensor 105 is stored in advance as a history. Next, the electronic control device 107 predicts, based on a vehicle behavior detected by the vehicle sensor 105 after the vehicle 201 is actually caused to travel, the reached vibration to reach the vehicle 201 immediately after the detection by referring to the vehicle behavior stored in advance as a history. In a case where the acceleration sensor 204 is used as the vehicle sensor 105, the reached vibration to reach the vehicle shortly is predicted from an acceleration change history so far. In addition, pedal operation information of an accelerator or a brake, or operation information of a steering wheel may be used as the vehicle behavior.

Second Embodiment

Figure 8A:
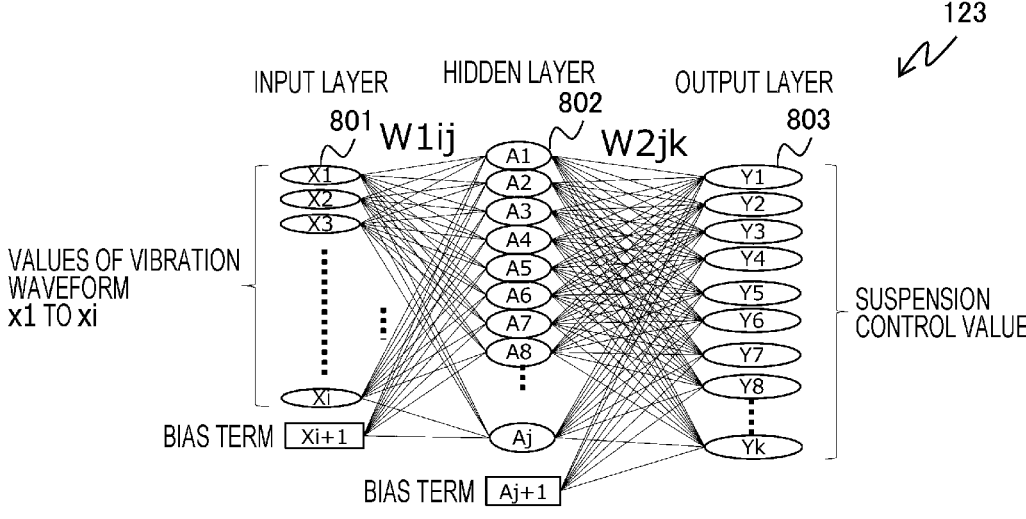
FIGS. 8(A) and 8(B) are diagrams illustrating an example of a control value calculation unit according to a second embodiment and a storage unit.
Figure 8B:
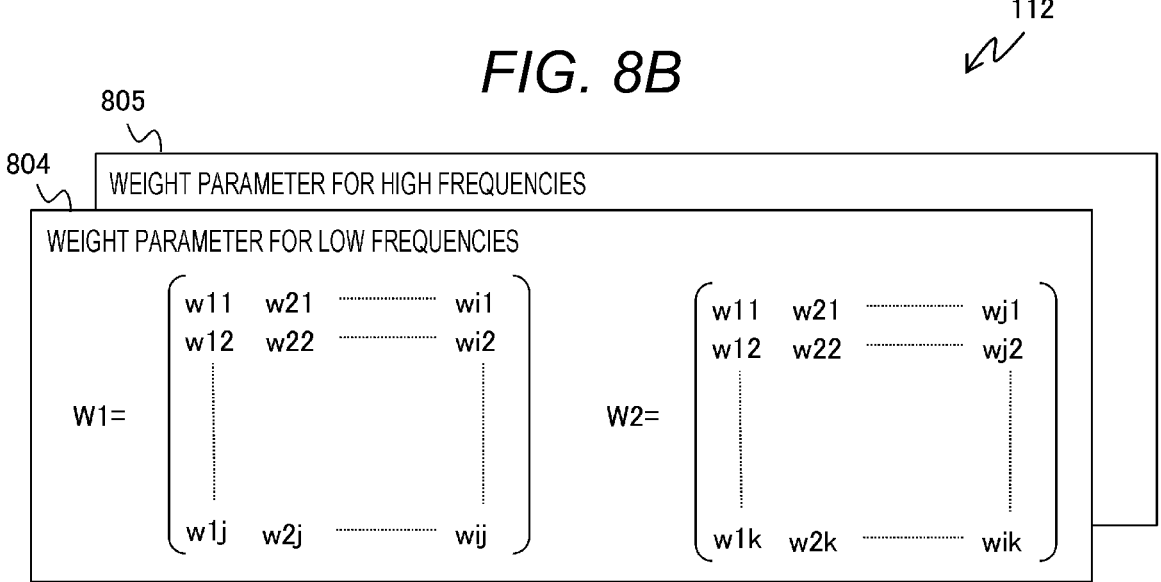

FIGS. 8(A) and 8(B) are diagrams illustrating an example of a control value calculation unit 123 according to the second embodiment and a storage unit 112. FIG. 8(A) illustrates the control value calculation unit 123, and FIG. 8(B) illustrates the storage unit 112. In the present embodiment, the control value calculation unit 113 described in the first embodiment is replaced with the control value calculation unit 123 including a neural network, and weight parameters 804 and 805 are stored in the storage unit 112 described in the first embodiment. Other configurations and the like are similar to those in FIGS. 1 to 6 for the first embodiment.

As illustrated in FIG. 8(A), the neural network in the control value calculation unit 123 of the present embodiment includes a hierarchical neural network having a three-layer configuration in which elements of an input layer (the number i+1 of elements) 801, a hidden layer (the number j+1 of elements) 802, and an output layer (the number K of elements) 803 are hierarchically combined. One element representing a bias term is set in each of the input layer 801 and the hidden layer 802. Each element of the input layer 801 and each element of the hidden layer 802 are connected through a weight $W1ij$ (i=1 to I+1 and j=1 to J+1), and each element of the hidden layer 802 and each element of the output layer 803 are connected through a weight $W2jk$ (j=1 to J+1 and k=1 to K). In the present embodiment, these pieces of weight information (hereinafter, referred to as weight parameters) are used by being divided into a weight parameter 804 for low frequencies and a weight parameter 805 for high frequencies of the reached vibration as illustrated in FIG. 8(B). The weight parameter 804 for low frequencies and the weight parameter 805 for high frequencies are expressed by determinants of the weight $W1ij$ and the weight $W2jk$, respectively. In this example, the simplest fully connected neural network in which the number of hidden layers 802 is one is illustrated, but the present invention is not limited thereto.

The neural network learns a correlation between the sampling values (x1 to xi) of the sampled vibration waveform and the suspension control value. The number of elements of the input layer 801 is the same as the number of sampling points within the window width, and the number of elements of the output layer 803 is determined by a control value resolution of the suspension control. For example, in a case where the control value resolution of the suspension control is 256 levels of digital values, the number of elements of the output layer 803 is 256. That is, the number of suspension control values and the number of elements are the same as each other. The suspension control value and the element are set in a one-to-one relationship, and among the 256 elements, only one element is set to 1

(high), and the other elements are set to 0 (low). The number of elements of the hidden layer 802 is determined in consideration of a balance between the number of elements of the input layer 801 and the number of elements of the output layer 803.

Figure 9:
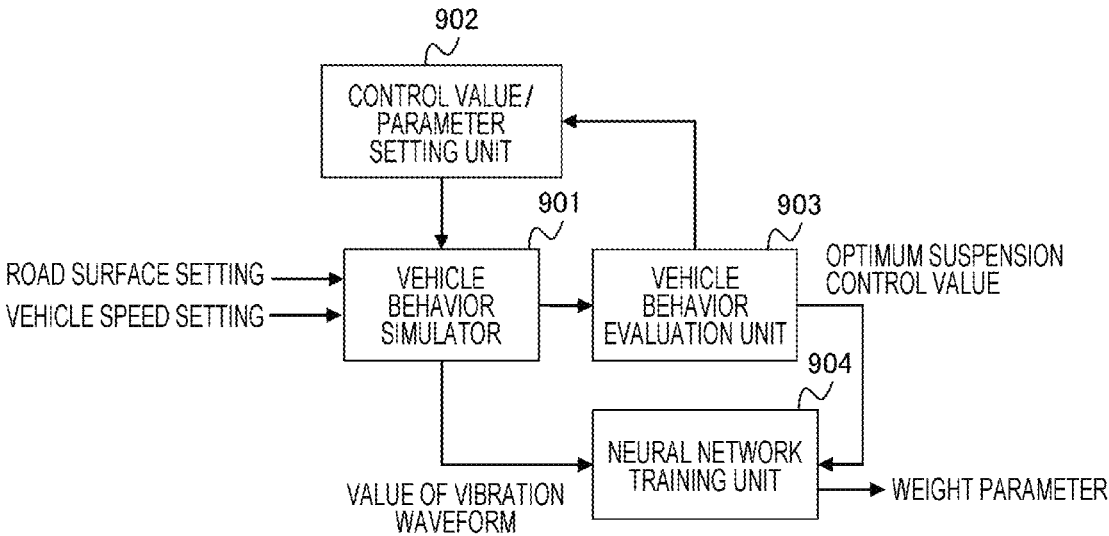
FIG. 9 is a configuration diagram of a training system according to the second embodiment that creates train data of a neural network.

FIG. 9 is a configuration diagram of a training system that creates train data of the neural network in the control value calculation unit 123 of the present embodiment. The weight parameters of the neural network illustrated in FIG. 8 are created by the training system.

The training system includes a vehicle behavior simulator 901, a control value/parameter setting unit 902, a vehicle behavior evaluation unit 903, and a neural network training unit 904.

The vehicle behavior simulator 901 inputs a road surface profile indicating the road surface displacement as a road surface setting and the vehicle speed as a vehicle speed setting, and calculates the vehicle behavior of a target vehicle for each vehicle speed, for example, a longitudinal acceleration, a vertical acceleration, a lateral acceleration, a yaw rate, a pitch rate, a roll rate, or the like with reference to a vehicle model. In addition, the vibration waveform is calculated from the road surface profile and the vehicle speed.

The control value/parameter setting unit 902 has various parameters related to a structure from the road surface to a chassis of the vehicle, for example, and can arbitrarily set the suspension control value.

The vehicle behavior evaluation unit 903 compares vehicle behavior data output by the vehicle behavior simulator 901, for example, the acceleration at a seat portion on which a passenger sits with an expected value or an existing simulation result to determine whether or not improvement is made. Then, in a case where the acceleration at the seat portion exceeds the expected value or further improvement is expected, the processing transitions to the control value/parameter setting unit 902 to set a control value different from the control value, and the vehicle behavior simulator 901 is executed. On the other hand, in a case where the acceleration at the seat portion falls below the expected value, or no further improvement is expected, the optimum control value obtained by the vehicle behavior simulator 901 is defined as the optimum suspension control value, and is transferred to the neural network training unit 904.

The neural network training unit 904 sets the sampling value, which is the time-series data of the vibration waveform derived by the vehicle behavior simulator 901, on an input side of the neural network and sets the optimum suspension control value derived by the vehicle behavior evaluation unit 903 on an output side of the neural network, and the neural network learns the relationship therebetween. The training of the neural network is performed by applying back propagation which is generally known as a training method.

In suspension control according to the related art, an optimum control value is calculated based on a motion equation based on a state of being suspended in the air called Skyhook theory. However, since an unrealistic state of being suspended in the air is assumed, an optimum suspension control value cannot necessarily be derived. On the other hand, in the present embodiment, the basic idea is that learning can be performed by the neural network in a case where the relationship between the road surface displacement and the optimum suspension control value is known. By using the simulator here, it is possible to check vehicle behaviors for various suspension control values although in a virtual environment, and there is a possibility that an optimal control value exceeding the Skyhook theory can be derived as a result by examining the vehicle behaviors with many parameters.

In the search by the training system, a reward is given to a good result and a penalty is given to a bad result among results evaluated by the vehicle behavior evaluation unit 903, so that reinforcement learning utilizing the vehicle behavior simulation can be performed. Ideally, it is sufficient if the acceleration felt by the passenger is zero, and the acceleration at the seat on which the passenger sits is set as an evaluation function to solve an optimization problem that minimizes the acceleration.

In the learning, the weight parameter of the neural network that outputs the optimum suspension control value is determined separately for a case where the frequency of the vibration waveform of the reached vibration based on the road surface displacement is low and a case where the frequency is high. Then, the determined weight parameter 804 for low frequencies and weight parameter 805 for high frequencies are stored in the storage unit 112 (see FIG. 2).

Figures 10A, 10B:
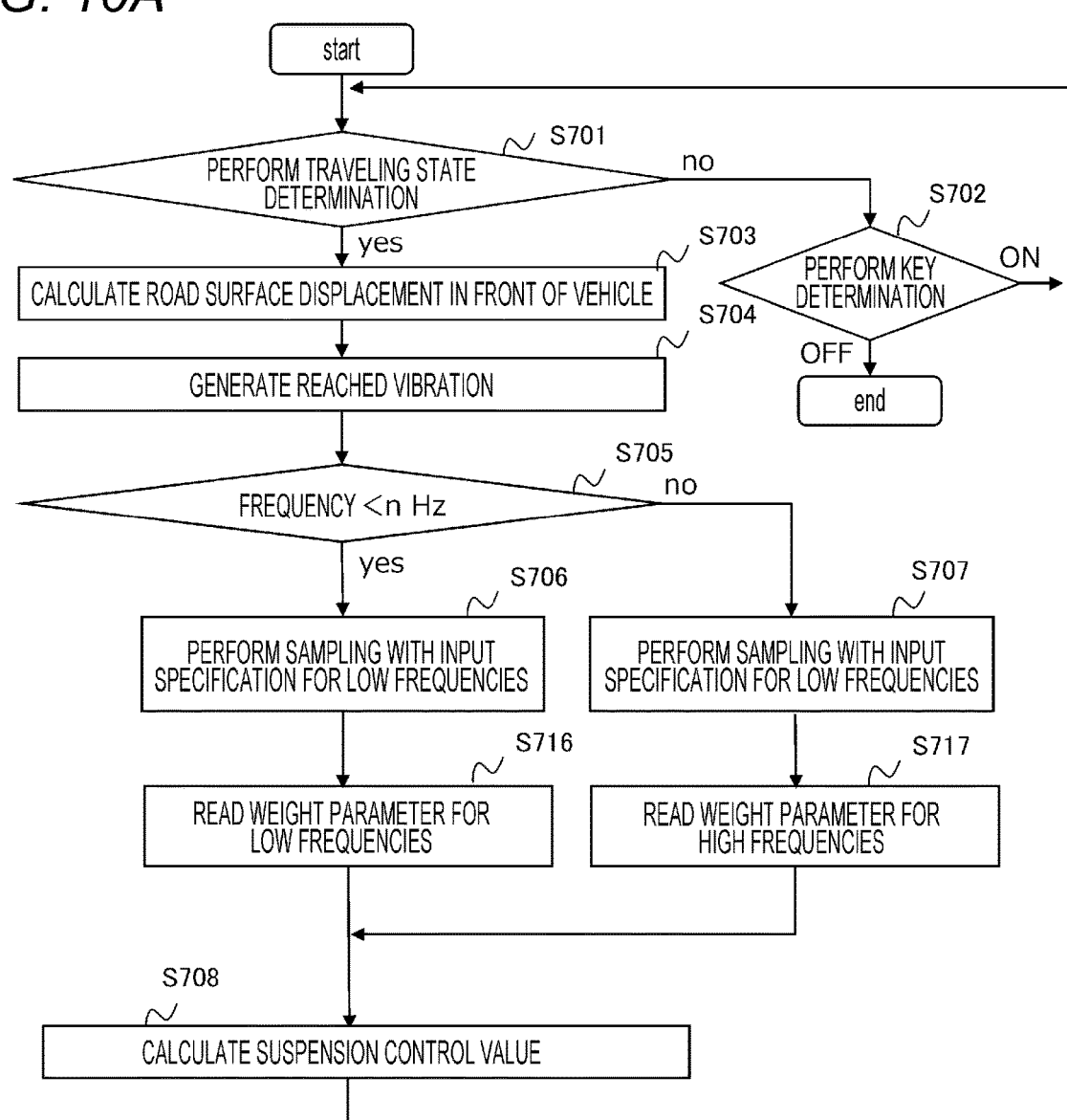
FIGS. 10(A) and 10(B) are a flowchart illustrating processing in an electronic control device according to the second embodiment and a diagram illustrating an input specification.

FIGS. 10(A) and 10(B) are a flowchart illustrating processing in an electronic control device 107 according to the second embodiment and a diagram illustrating an input specification. FIG. 10(A) is a diagram illustrating a flowchart illustrating the processing in the electronic control device 107, and FIG. 10(B) is a diagram illustrating the input specification in the processing in the electronic control device 107. The same processing as that in the flowchart illustrating the processing in the electronic control device 107 in the first embodiment illustrated in FIG. 7 are denoted by the same reference numeral, and a description thereof will be simplified.

In a case where it is determined in step S701 that the vehicle is in the traveling state, the processing proceeds to step S703. In step S703, the reached vibration generation unit 109 of the electronic control device 107 calculates the road surface displacement in front of the vehicle from data received from the road surface measurement sensor 106. Then, in next step S704, the reached vibration generation unit 109 generates the reached vibration reaching the vehicle based on the calculated road surface displacement and the detected vehicle speed from the vehicle sensor 105.

Next, in step S705, the frequency determination unit 110 determines the frequency of the reached vibration generated by the reached vibration generation unit 109. Specifically, the reached vibration frequency analysis is performed to determine whether the peak of the frequency is higher or lower than the reference n Hz. In a case where the peak of the frequency is lower than the reference n Hz, the processing proceeds to step S706, and in a case where the peak of the frequency is equal to or higher than the reference n Hz, the processing proceeds to step S707.

In step S706, the sampling processing unit 111 performs sampling with the input specification for low frequencies illustrated in FIG. 10(B). As a result, as illustrated in FIG. 5(A), i sampling values (x1 to xi) are acquired from the vibration waveform in the window width 503. Thereafter, the processing proceeds to step S716.

In step S716, the weight parameter 804 for low frequencies (see FIG. 8(B)) is read from the storage unit 112. The weight parameter 804 is a weight parameter between elements used in the neural network.

In step S707, the sampling processing unit 111 performs sampling with the input specification for high frequencies illustrated in FIG. 10(B). As a result, as illustrated in FIG. 6(C), i sampling values (x1 to xi) are acquired from the vibration waveform in the window width 603. Thereafter, the processing proceeds to step S717.

In step S717, the weight parameter 805 for high frequencies (see FIG. 8(B)) is read from the storage unit 112. The weight parameter 805 is a weight parameter between elements used in the neural network.

After the processing of step S716 or step S717, the processing proceeds to step S708. In step S708, the control value calculation unit 123 calculates the suspension control value by using the sampling values (x1 to xi) of the sampled vibration waveform, and controls the suspension based on the suspension control value. The control value calculation unit 123 includes the neural network, and calculates the suspension control value based on the weight parameters 804 for low frequencies or the weight parameters 805 for high frequencies read in the processing of step S716 or step S717.

The window width is made different between a case where the frequency of the reached vibration is low and a case where the frequency of the reached vibration is high, but the number of sampling values is the same, so that the window width can be matched with the number of elements of the input layer 801 of the neural network. In addition, the number of elements of the output layer 803 is the same as the number of suspension control values. Furthermore, the number of weight parameters for low frequencies or high frequency is the same. Therefore, the configuration of the neural network does not need to be changed according to the frequency of the reached vibration, and the processing can also be speeded up.

After the processing of step S708, the processing returns to the processing of step S701, and the above-described steps S703 to S708 are repeated.

According to the present embodiment, it is possible to accurately grasp the vibration waveform and learn the relationship between the feature of the road surface and the optimum suspension control value regardless of the frequency of the reached vibration reaching the vehicle. As a result, since the feature of the road surface on which the vehicle is scheduled to travel can be accurately grasped and the suspension can be optimally controlled, it is possible to achieve suitable ride comfort.

Third Embodiment

Figure 11:
FIG. 11 is a diagram illustrating an example of a control value calculation unit according to a third embodiment.
Figure 11:
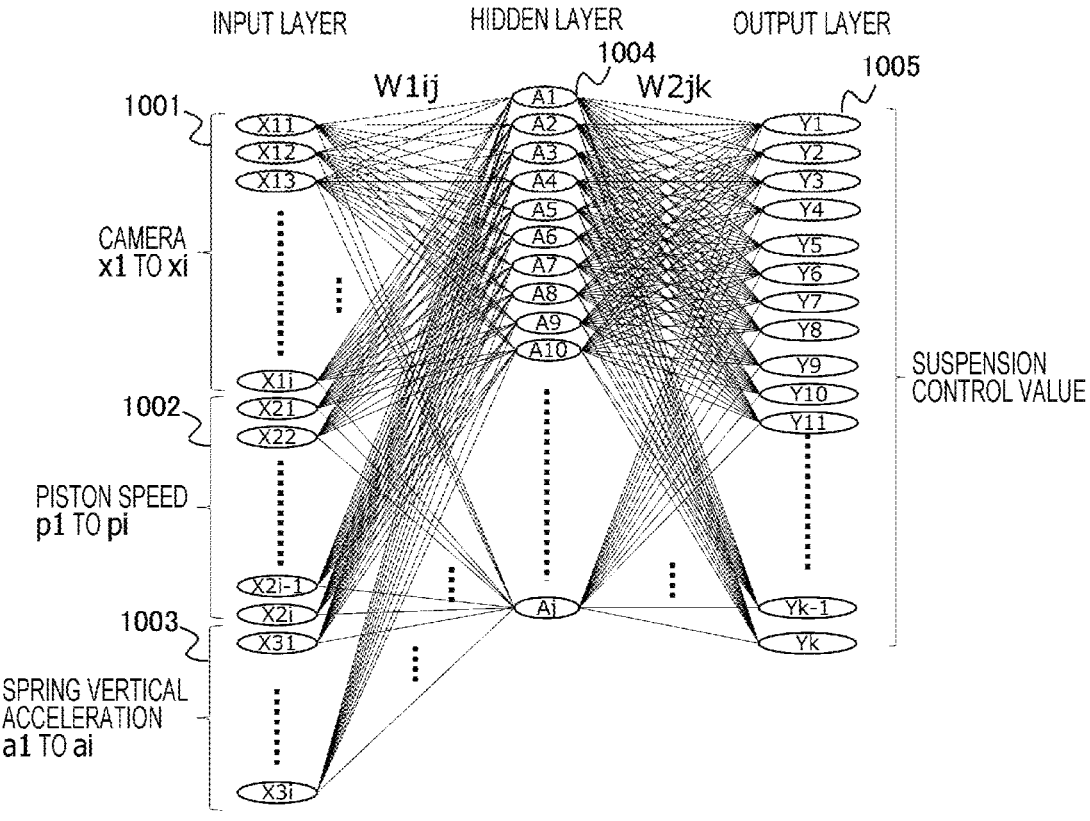

FIG. 11 is a diagram illustrating an example of a control value calculation unit 133 according to a third embodiment. In the present embodiment, the control value calculation unit 113 described in the first embodiment is replaced with the control value calculation unit 133 including a neural network different from that described in the second embodiment. Other configurations and the like are similar to those in FIGS. 1 to 6 for the first embodiment.

The present embodiment improves the calculation accuracy by calculating the suspension control value using not only the reached vibration generated by the reached vibration generation unit 109 described in the first embodiment and the second embodiment, that is, the reached vibration predicted based on an image from the camera 205 but also the vehicle behavior during traveling, for example, the reached vibration predicted from a piston speed of the suspension or a spring vertical acceleration of the vehicle.

As illustrated in FIG. 11, the neural network in the control value calculation unit 133 of the present embodiment includes a hierarchical neural network having a three-layer configuration in which elements of input layers 1001 to 1003, a hidden layer 1004, and an output layer 1005 are hierarchically combined. The elements of the input layer 1001 are X11 to X1i, the elements of the input layer 1002 are X21 to X2i, and the elements of the input layer 1003 are X31 to X3i.

Sampling values (x1 to xi) of the vibration waveform predicted based on the image from the camera 205 are input to the elements of the input layer 1001. Sampling values (p1 to pi) of the vibration waveform based on the piston speed are input to the elements of the input layer 1002. Sampling values (a1 to ai) of the vibration waveform based on the spring vertical acceleration are input to the elements of the input layer 1003. As in the first and second embodiments, the sampling values input to the neural network are values obtained by sampling the vibration waveform of the reached vibration generated by a reached vibration generation unit 109 within a window width range corresponding to the frequency.

Figure 12A:
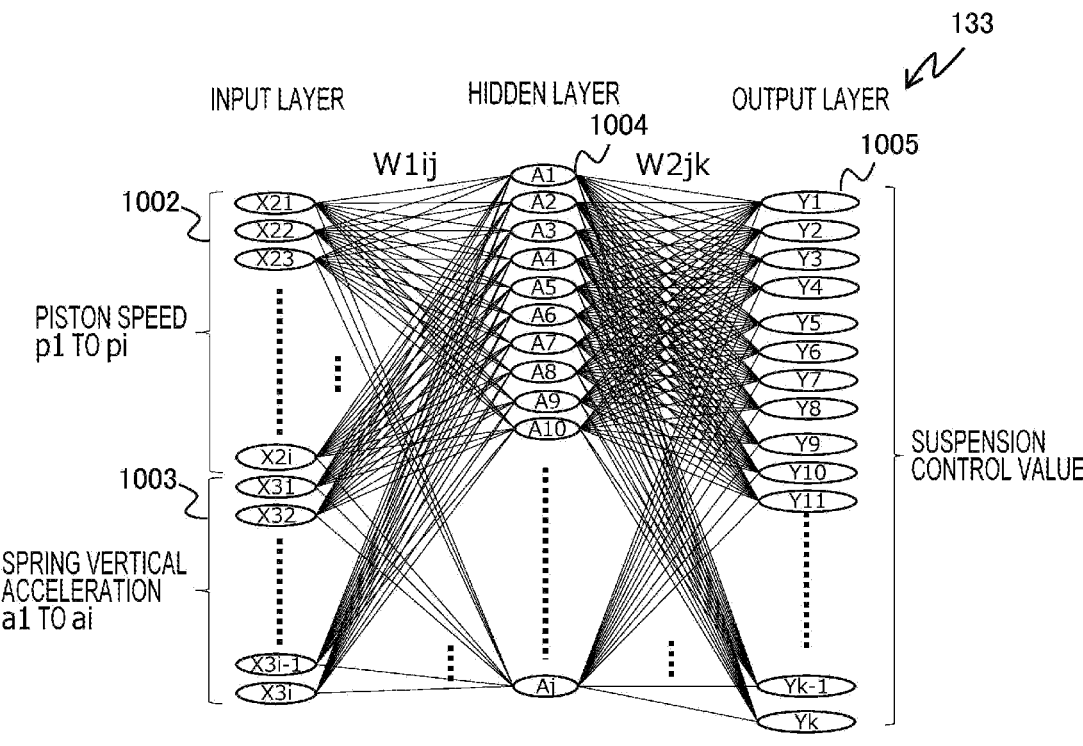
FIGS. 12(A) and 12(B) are graphs for describing a modification of the control value calculation unit according to the third embodiment and prediction of a reached vibration waveform from an actual measured value.

FIG. 12(A) is a diagram illustrating a modification of the control value calculation unit 133 according to the third embodiment. The modification illustrates a case where the sampling values (x1 to xi) of the vibration waveform predicted based on the image from the camera 205 are not input.

As illustrated in FIG. 12(A), the neural network in the control value calculation unit 133 of the present embodiment may include a hierarchical neural network having a three-layer configuration in which the elements of the input layers 1002 and 1003, the hidden layer 1004, and the output layer 1005 are hierarchically combined. The elements of the input layer 1002 are X21 to X2i, and the elements of the input layer 1003 are X31 to X3i.

The piston speed and the sampling values (p1 to pi) of the vibration waveform predicted based on the piston speed are input to the elements of the input layer 1002. The sampling values (a1 to ai) of the vibration waveform predicted based on the spring vertical acceleration, and the spring vertical acceleration are input to the elements of the input layer 1003. As in the first and second embodiments, the sampling values input to the neural network are values obtained by sampling the vibration waveform of the reached vibration generated by a reached vibration generation unit 109 within a window width range corresponding to the frequency.

Figure 12B:
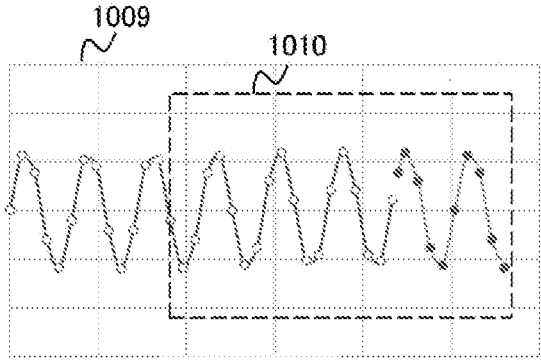

FIG. 12(B) is a graph for describing prediction of the reached vibration waveform from an actual measured value using the piston speed as an example. The horizontal axis represents time, and the vertical axis represents the piston speed. A white circle indicates an actual measured value, and a black circle indicates a predicted value.

As illustrated in FIG. 12(B), a value 1009 of the vibration waveform is input from a vehicle sensor 105. The control value calculation unit 133 including the neural network receives the sampling values (the white circles and black circles in the drawing) of the vibration waveform in a window width 1010 generated by the reached vibration generation unit 109. Here, among the sampling values of the vibration waveform included in the window width 1010, about 80% in the first half corresponds to the actual measured values (the white circles in the drawing), and about 20% in the second half corresponds to the predicted values (the black circles in the drawing) predicted and determined from the situation in the first half. As a result, it is possible to implement feedforward control for deriving the optimum suspension control value immediately before actual traveling, instead of feedback control for deriving the optimum suspension control value after the actual measured values are obtained. In a case where the prediction is wrong, there is a possibility that the optimum control cannot be necessarily performed. However, since it is predicted that the defect occurs only in a state where the characteristic of the road surface displacement is switched, and it is difficult for the passenger to feel the defect, the predicted value may be included in some values of the vibration waveform. In addition, the value of the vibration waveform to be input to the control value calculation unit 133 may be determined by time-series prediction using a recurrent neural network (RNN). The example of the piston speed has been described above, and the same applies to the spring vertical acceleration. In the example described with reference to FIG. 12(A), the piston speed and the spring vertical acceleration include not only the actual measured values but also the predicted values.

In the present embodiment, an acceleration sensor that detects the piston speed and an acceleration sensor that detects the spring vertical acceleration are installed as vehicle sensors 105 on a vehicle body 101. The reached vibration generation unit 109 generates the reached vibration including the predicted value described with reference to FIG. 12(B) based on sensor values input from the vehicle sensors 105. Then, the frequency of the generated reached vibration is determined by a frequency determination unit 110, and is sampled with a window width corresponding to the frequency by a sampling processing unit 111. The number of sampling values sampled from the vibration waveform of the reached vibration is the same regardless of the window width. The sampling values (p1 to pi) of the vibration waveform of the reached vibration generated from the piston speed are input to the elements of the input layer 1002, and the sampling values (a1 to ai) of the vibration waveform of the reached vibration generated from the spring vertical acceleration are input to the elements of the input layer 1003.

Figure 13:
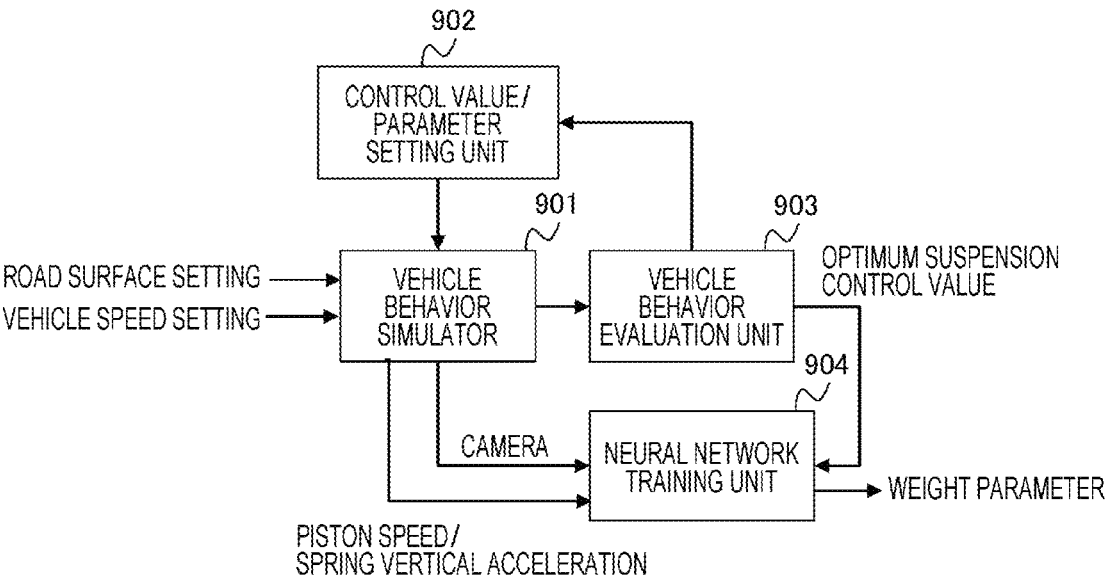
FIG. 13 is a configuration diagram of a training system according to the third embodiment that creates train data of a neural network.

FIG. 13 is a configuration diagram of a training system that creates train data of the neural network in the control value calculation unit 133 of the present embodiment. The weight parameters of the neural network illustrated in FIG. 11 are created by the training system. The same portions as those of the training system illustrated in FIG. 9 are denoted by the same reference numerals, and a description thereof will be simplified.

A vehicle behavior simulator 901 illustrated in FIG. 13 calculates the vibration waveform by a camera image from the road surface profile and the vehicle speed, and calculates the vibration waveforms corresponding to the piston speed and the spring vertical acceleration, respectively. A neural network training unit 904 performs learning in consideration of the sampling values that are time-series data of the vibration waveforms derived by the vehicle behavior simulator 901.

As described with reference to FIG. 9, the training system performs simulation a plurality of times with different suspension control values, and derives a simulation optimum control value based on determination by a vehicle behavior evaluation unit 903. In the example illustrated in FIG. 13, an acceleration sensor model is installed in a vehicle in the simulation, and time-series data of a sensor output acquired based on the optimum control value, particularly, the piston speed and the spring vertical acceleration used for calculation of the suspension control value according to the related art are calculated by the vehicle behavior simulator 901. The sampling value of the vibration waveform obtained based on the road surface displacement and the vehicle speed by the camera 205, and the sampling value of the vibration waveform based on the piston speed and the sampling value of the vibration waveform based on the spring vertical acceleration obtained from the vehicle sensor 105 are input from the vehicle behavior simulator 901 to the neural network training unit 904. Further, the optimum suspension control value determined by the vehicle behavior evaluation unit 903 is input. In the neural network training unit 904, the sampling value of the vibration waveform indicating a predicted road surface from the camera 205, the sampling value of the vibration waveform of the piston speed, and the sampling value of the vibration waveform of the spring vertical acceleration are set on an input side of the neural network, and the optimum suspension control value is set on an output side of the neural network, and a relationship therebetween is learned.

In the learning, weight parameters A to D (see FIG. 14(B) to be described later) of the neural network that outputs the optimum suspension control value are determined according to the frequency of the vibration waveform of the reached vibration. Then, the determined weight parameter corresponding to the frequency is stored in a storage unit 112 (see FIG. 2).

Figures 14A, 14B:
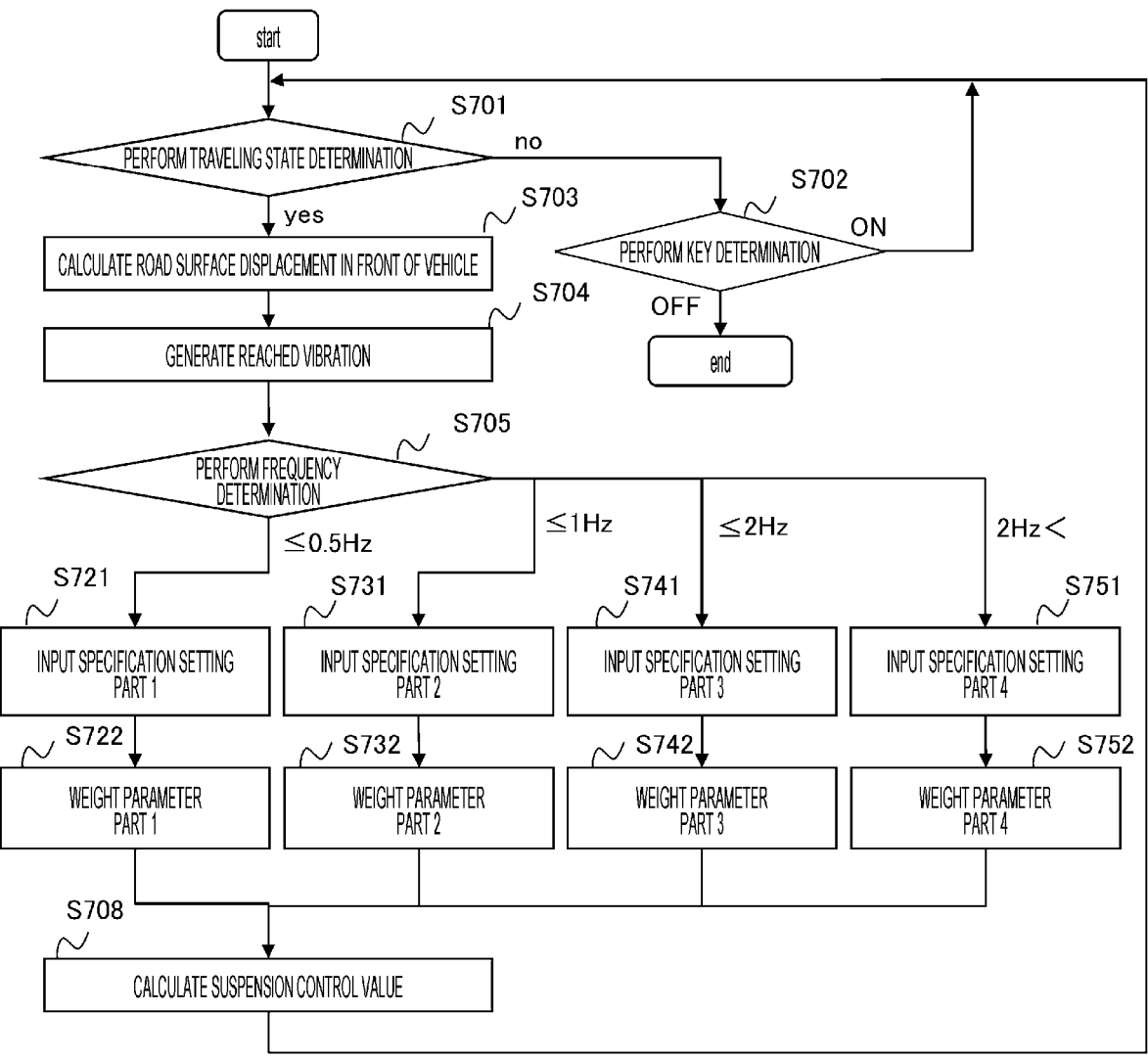
FIGS. 14(A) and 14(B) are a flowchart illustrating processing in an electronic control device according to the third embodiment and a diagram illustrating an input specification.

FIGS. 14(A) and 14(B) are a flowchart illustrating processing in an electronic control device 107 according to the third embodiment and a diagram illustrating an input specification. FIG. 14(A) is a diagram illustrating a flowchart illustrating the processing in the electronic control device 107, and FIG. 14(B) is a diagram illustrating the input specification in the processing in the electronic control device 107.

In the first and second embodiments illustrated in FIGS. 7(A) and 10, the input specification of the control value calculation unit and the weight parameter of the neural network are made different between a case where the frequency of the reached vibration is low and a case where the frequency of the reached vibration is high. In the third embodiment, the input specification of the control value calculation unit and the weight parameter of the neural network are made different depending on the frequency of the reached vibration. In the processing of the flowchart of FIG. 14(A), the same portions as those in the processing illustrated in FIGS. 7(A) and 10 are denoted by the same reference numerals, and a description thereof will be simplified.

In the following description, a case where the electronic control device 107 uses the control value calculation unit 133 illustrated in FIG. 11 will be described. The same applies to a case of using the control value calculation unit 133 illustrated in FIG. 12(A).

In a case where it is determined in step S701 illustrated in FIG. 14(A) that the vehicle is in the traveling state, the processing proceeds to step S703. In step S703, the reached vibration generation unit 109 of the electronic control device 107 calculates the road surface displacement in front of the vehicle from data received from the road surface measurement sensor 106. Then, in next step S704, the reached vibration generation unit 109 generates the reached vibration reaching the vehicle based on the calculated road surface displacement and the detected vehicle speed from the vehicle sensor 105.

Next, in step S705, the frequency determination unit 110 determines the frequency of the reached vibration generated by the reached vibration generation unit 109. Specifically, the reached vibration frequency analysis is performed to determine whether the frequency is equal to or lower than 0.5 Hz, higher than 0.5 Hz and equal to or lower than 1.0 Hz, higher than 1.0 Hz and equal to or lower than 2.0 Hz, or higher than 2.0 Hz.

In a case where the frequency is equal to or lower than 0.5 Hz, the processing proceeds to step S721, and Part 1 of the input specification illustrated in FIG. 14(B) is set. The input specification illustrated in FIG. 14(B) is an example. In this example, the sampling processing unit 111 samples the vibration waveform in a state in which the window width is set to 2.0 seconds, the sampling interval is set to 40 ms, and the number of samples is set to 50. Then, the processing proceeds to the next step S722, and the weight parameter A is set with reference to Part 1 of the input specification illustrated in FIG. 14(B).

In a case where the frequency is higher than 0.5 Hz and equal to or lower than 1.0 Hz, the processing proceeds to step S731, and Part 2 of the input specification illustrated in FIG. 14(B) is set. In this example, the sampling processing unit 111 samples the vibration waveform in a state in which the window width is set to 1.0 seconds, the sampling interval is set to 20 ms, and the number of samples is set to 50. Then, the processing proceeds to the next step S732, and the weight parameter B is set with reference to Part 2 of the input specification illustrated in FIG. 14(B).

In a case where the frequency is higher than 1.0 Hz and equal to or lower than 2.0 Hz, the processing proceeds to step S741, and Part 3 of the input specification illustrated in FIG. 14(B) is set. In this example, the sampling processing unit 111 samples the vibration waveform in a state in which the window width is set to 0.5 seconds, the sampling interval is set to 10 ms, and the number of samples is set to 50. Then, the processing proceeds to the next step S742, and the weight parameter C is set with reference to Part 3 of the input specification illustrated in FIG. 14(B).

In a case where the frequency is higher than 2.0 Hz, the processing proceeds to step S751, and Part 4 of the input specification illustrated in FIG. 14(B) is set. In this example, the sampling processing unit 111 samples the vibration waveform in a state in which the window width is set to 0.25 seconds, the sampling interval is set to 5 ms, and the number of samples is set to 50. Then, the processing proceeds to the next step S752, and the weight parameter D is set with reference to Part 4 of the input specification illustrated in FIG. 14(B).

After the processing of steps S722, S732, S742, and S752, the processing proceeds to step S708. In step S708, the control value calculation unit 133 includes the neural network, and calculates the suspension control value based on the weight parameter corresponding to the frequency.

In step S705, an example has been described in which the frequency determination unit 110 performs determination by classifying the frequency of the reached vibration generated by the reached vibration generation unit 109 into four classifications. However, this is an example, and setting is appropriately made according to the configuration of the vehicle and the surrounding environment.

In order to simplify the description, an example has been described in which the reached vibration generation unit 109 generates the reached vibration reaching the vehicle based on the road surface measurement sensor 106 (for example, the camera 205) in step S703, and the frequency determination unit 110 determines the frequency of the reached vibration in step S705. However, in the processing, not only the reached vibration indicating the predicted road surface from the camera 205 but also the reached vibration of the piston speed or the spring vertical acceleration may be used. In this case, all of the reached vibration indicating the predicted road surface from the camera 205, the reached vibration of the piston speed or the spring vertical accelera-tion may be used, any reached vibration may be used in combination, or only any reached vibration may be used. In general, since the reached vibration reaching the vehicle is similar in both cases, the bump of the road surface can be captured.

The window width is made different depending on the frequency of the reached vibration, but the number of sampling points is the same, so that it is possible to match the window width with the number of elements of the input layer 1001 of the neural network. In addition, the number of elements of the output layer 1005 is the same as the number of suspension control values. Furthermore, the number of weight parameters is the same regardless of the frequency. Therefore, the configuration of the neural network does not need to be changed according to the frequency of the reached vibration, and the processing can also be speeded up.

After the processing of step S708, the processing returns to the processing of step S701, and the above-described processing of steps S703 to S752 are repeated.

According to the present embodiment, it is possible to accurately grasp the vibration waveform and learn the relationship between the feature of the road surface and the optimum suspension control value regardless of the fre-quency of the reached vibration reaching the vehicle. Not only the reached vibration from the camera 205 but also the reached vibration of the piston speed and the spring vertical acceleration can be used, and the feature of the road surface on which the vehicle is scheduled to travel can be accurately grasped to optimally control the suspension, so that suitable ride comfort can be achieved.

Fourth Embodiment

Figures 15A, 15B, 15C:
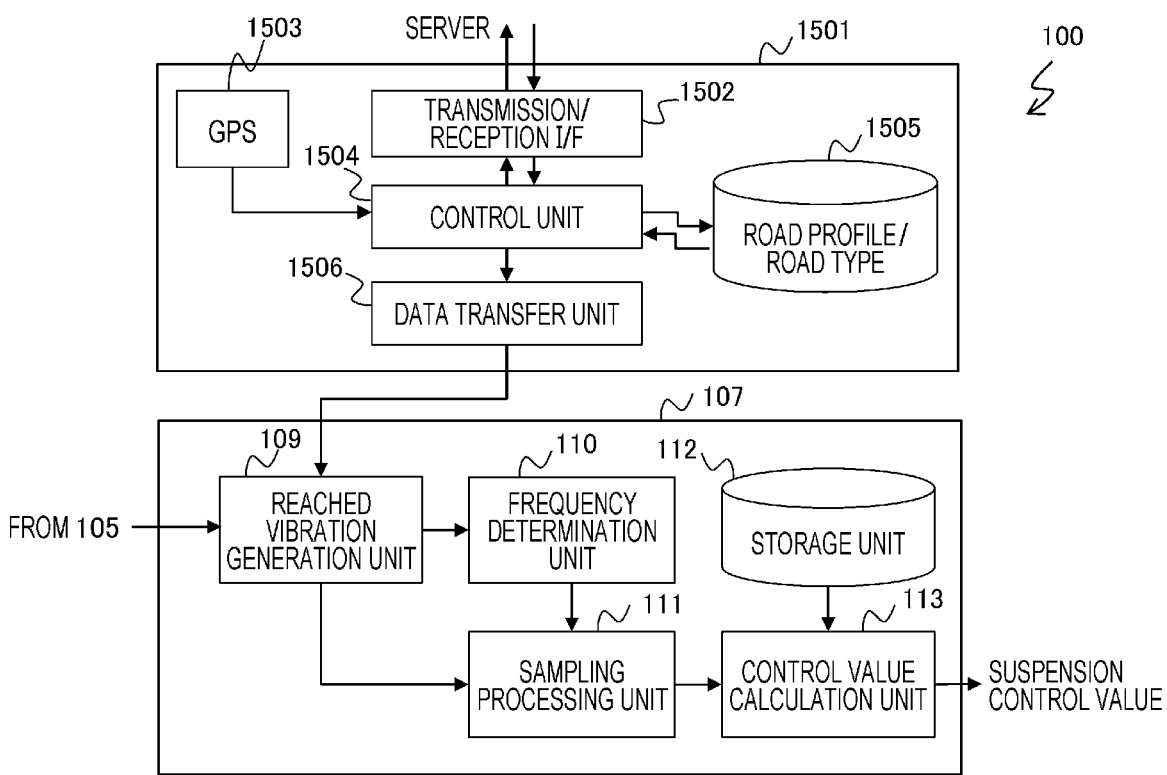
FIGS. 15(A), 15(B), and 15(C) are diagrams illustrating a suspension control device according to a fourth embodiment.

FIGS. 15(A), 15(B), and 15(C) are diagrams illustrating a suspension control device 100 according to the present embodiment. FIG. 15(A) is a block configuration diagram of electronic control devices 107 and 1501 included in the suspension control device 100 of the present embodiment, FIG. 15(B) is a diagram illustrating a road profile, and FIG. 15(C) is a diagram illustrating a road type.

In the present embodiment, generation of the reached vibration based on the road profile obtained from a server device is performed instead of generation of the reached vibration based on a camera 205 mounted on the vehicle.

A block configuration diagram of the electronic control device 107 illustrated in FIG. 15(A) illustrates a configura-tion similar to that of the electronic control device 107 illustrated in FIG. 2. Similarly to the electronic control device 107, the electronic control device 1501 is provided in the suspension control device 100 of the vehicle. The electronic control device 1501 includes a transmission/reception I/F 1502, a GPS 1503, a control unit 1504, a storage 1505 for storing a road profile/road type, and a data transfer unit 1506. The electronic control device 1501 may be referred to as a road surface profile acquisition unit.

It is assumed that the server device (not illustrated) manages a digitized map and a road surface profile in which road shape information of a road surface is recorded for each road. The vehicle acquires a host vehicle position by the in-vehicle GPS 1503, inquires of the server device via the transmission/reception I/F 1502 about the road surface pro-file within a certain range, for example, a radius of 5 km based on the host vehicle position, and downloads corre-sponding data. The downloaded road surface profile is stored in the storage 1505. Then, the road surface profile in front of the vehicle that is traveling is transferred to a reached vibration generation unit 109 via the data transfer unit 1506.

The control unit 1504 manages transmission/reception and transfer of the pieces of data.

Here, a data range acquired from the server device is within a radius of 5 km, but may be larger or smaller. In addition, the road profile of a road range in which the vehicle is scheduled to travel may be acquired in cooperation with a car navigation system.

As illustrated in FIG. 15(B), the road profile defines roads A and B by using a distance between intersections or the like. Then, the distance between intersections is, for example, 10 m for the road A, and the road shape information such as height information is defined every 1 cm for the road A. The reached vibration generation unit 109 plots a road surface displacement by setting the distance on the horizontal axis based on the road shape information. Furthermore, the reached vibration for which time is set on the horizontal axis is generated by considering the vehicle speed acquired from a vehicle sensor 105. Referring to FIG. 15(C), the road type indicating whether the road is a level road, a gravel road, a rough road, or the like is stored for each of the roads A, B, and the like, and the reached vibration determined in advance for each road type may be generated with reference to these road types.

After the generation of the reached vibration, similarly to any one of the first to third embodiments, the frequency of the generated reached vibration is determined, sampling processing is performed, and the suspension control value is calculated, thereby controlling the suspension.

According to the present embodiment, the same effects as those of the first to third embodiments can be obtained. In addition, even in a case where the road surface displacement cannot be detected by a road surface measurement sensor 106 or the like due to a traveling environment or a traveling condition, it is possible to temporarily obtain information from the outside of the suspension control device 100 and continue the control of the suspension. Alternatively, instead of detecting the road surface displacement by the road surface measurement sensor 106 or the like, information can be obtained from the outside of the suspension control device 100 to control the suspension.

According to the above-described embodiments, the following actions and effects can be obtained.

(1) The suspension control device 100 is the suspension control device 100 that is connected to the sensors 105 and 106 that acquire information regarding the vehicle 201 or surrounding information of the vehicle 201, and calculates the suspension control value for controlling the suspension 103 of the vehicle 201 based on the information acquired by the sensors 105 and 106. The suspension control device includes: the reached vibration generation unit 109 that generates the reached vibration reaching the vehicle 201 based on the information acquired by the sensors 105 and 106; the sampling processing unit 111 that samples the vibration waveform of the reached vibration by changing the time width for sampling the vibration waveform of the reached vibration according to the frequency of the reached vibration generated by the reached vibration generation unit 109; and the control value calculation unit 113, 123, or 133 that calculates the suspension control value based on the sampling value of the vibration waveform sampled by the sampling processing unit 111. Therefore, the vibration waveform can be grasped regardless of the frequency of the reached vibration reaching the vehicle, so that the controllability of the suspension can be improved.

(2) A control method of the suspension control device 100 is a suspension control method in the suspension control device 100 that controls the suspension 103 of the vehicle 201 by using the sensors 105 and 106 that acquire information regarding the vehicle 201 or surrounding information of the vehicle 201. The suspension control method includes: generating the reached vibration reaching the vehicle 201 based on the information acquired by the sensors 105 and 106; sampling the vibration waveform of the reached vibration by changing the time width for sampling the vibration waveform of the reached vibration according to the frequency of the generated reached vibration; calculating the suspension control value based on the sampling value of the sampled vibration waveform; and controlling the suspension 103 based on the calculated suspension control value. Therefore, the vibration waveform can be grasped regardless of the frequency of the reached vibration reaching the vehicle, so that the controllability of the suspension can be improved.

The present invention is not limited to the above-described embodiments, and other forms conceivable within the scope of the technical idea of the present invention also fall within the scope of the present invention as long as the features of the present invention are not impaired. In addition, a configuration in which the above-described embodiments are combined may be employed.

REFERENCE SIGNS LIST

1 suspension control model
100 suspension control device
101 vehicle body
102 wheel
103 suspension
104 tire
105 vehicle sensor
106 road surface measurement sensor
107, 1501 electronic control device
109 reached vibration generation unit
110 frequency determination unit
111 sampling processing unit
112 storage unit
113, 123, 133 control value calculation unit
201 vehicle
202 front wheel suspension
203 rear wheel suspension
204 acceleration sensor
205 camera
503, 603 window width (time width)
801, 1001 to 1003 input layer of neural network
802, 1004 hidden layer of neural network
803, 1005 output layer of neural network
804, 805 weight parameter
901 vehicle behavior simulator
902 control value/parameter setting unit
903 vehicle behavior evaluation unit
904 neural network training unit
1502 transmission/reception I/F
1503 GPS
1504 control unit
1505 storage for road profile/road type
1506 data transfer unit
S, S1, S2 road surface

The invention claimed is:

1. A suspension control device that is connected to a sensor that acquires information regarding a vehicle or surrounding information of the vehicle, and calculates a suspension control value for controlling a variable damping force of a suspension of the vehicle based on the information acquired by the sensor, the suspension control device comprising:

a processor, a memory, and a storage, the processor configured to perform:

a vibration generation function that generates a vibration expected to reach the vehicle based on the information acquired by the sensor, the information including a road surface of the vehicle;

a frequency determination function that determines a frequency of the vibration expected to reach the vehicle generated by the vibration generation function;

a sampling processing function that samples a vibration waveform representing a topography of the road surface of the vehicle of the vibration expected to reach the vehicle by changing a time width for sampling the vibration waveform of the vibration expected to reach the vehicle according to the determined frequency of the vibration expected to reach the vehicle generated by the vibration generation function; and a control value calculation function that calculates the suspension control value based on a sampling value of the vibration waveform sampled by the sampling processing function, wherein the sampling processing function samples the vibration waveform representing a topography of the road surface of the vehicle according to a predetermined number of sampling values regardless of the time width, and wherein the suspension control device controls the variable damping force of the suspension based on the calculated suspension control value.

2. The suspension control device according to claim 1, wherein the sampling processing function sets a number of sampling values when sampling the vibration waveform of the vibration expected to reach the vehicle to a constant number regardless of the frequency of the vibration expected to reach the vehicle.

3. The suspension control device according to claim 2, wherein the sampling processing function samples the vibration waveform of the vibration expected to reach the vehicle in a state in which the time width is set to be large and the sampling interval is set to be wide in a case where the frequency of the vibration expected to reach the vehicle is low, and in a state in which the time width is set to be small and the sampling interval is set to be narrow in a case where the frequency of the vibration expected to reach the vehicle is high.

4. The suspension control device according to claim 1, wherein the vibration expected to reach the vehicle generation function predicts the vibration expected to reach the vehicle reaching the vehicle based on a road surface displacement acquired by the sensor and a vehicle speed of the vehicle.

5. The suspension control device according to claim 4, wherein the information acquired by the sensor includes at least one of a camera image, a piston speed of the suspension, or a spring vertical acceleration of the vehicle.

6. The suspension control device according to claim 1, further comprising a road surface profile acquisition function that acquires road shape information at a current position of the vehicle, wherein the vibration expected to reach the vehicle generation function predicts the vibration expected to reach the vehicle reaching the vehicle based on the road surface displacement created from the road shape information and a vehicle speed of the vehicle.

7. The suspension control device according to claim 6, wherein the road surface profile acquisition function downloads the road shape information from a server device.

8. The suspension control device according to claim 1, wherein the control value calculation function includes a neural network, and the neural network calculates the suspension control value by using a weight parameter corresponding to the frequency of the vibration expected to reach the vehicle.

9. The suspension control device according to claim 8, wherein a number of sampling values of the vibration waveform sampled by the sampling processing function is a constant number regardless of the frequency of the vibration expected to reach the vehicle, and an input layer of the neural network includes a same number of elements as the number of sampling values of the vibration waveform.

10. A suspension control method in a suspension control device that controls a variable damping force of a suspension of a vehicle by using a sensor that acquires information regarding the vehicle or surrounding information of the vehicle, the suspension control method comprising:

generating a vibration expected to reach the vehicle based on the information acquired by the sensor, the information including a road surface of the vehicle;

determining a frequency of the generated vibration expected to reach the vehicle;

sampling a vibration waveform of the vibration expected to reach the vehicle by changing a time width for sampling the vibration waveform of the vibration expected to reach the vehicle according to the frequency of the generated vibration expected to reach the vehicle;

calculating a suspension control value based on a sampling value of the sampled vibration waveform; and controlling the suspension based on the calculated suspension control value, wherein the sampling samples the vibration waveform representing a topography of the road surface of the vehicle according to a predetermined number of sampling values regardless of the time width.

11. The suspension control method according to claim 10, wherein a number of sampling values of the sampled vibration waveform is a constant number regardless of the frequency of the vibration expected to reach the vehicle, and the suspension control value is calculated by applying a weight parameter corresponding to the frequency of the vibration expected to reach the vehicle to a neural network in which an input layer includes a same number of elements as the number of sampling values of the vibration waveform.

* * * * *